(12) United States Patent
Flemings et al.

(10) Patent No.: US 6,645,323 B2
(45) Date of Patent: Nov. 11, 2003

(54) METAL ALLOY COMPOSITIONS AND PROCESS

(75) Inventors: Merton C. Flemings, Cambridge, MA (US); Raul A. Martinez-Ayers, Somerville, MA (US); Anacleto M. de Figueredo, Newton, MA (US); James A. Yurko, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/104,536

(22) Filed: Mar. 25, 2002

(65) Prior Publication Data

US 2002/0096231 A1 Jul. 25, 2002

Related U.S. Application Data (62) Division of application No. 09/666,700, filed on Sep. 21, 2000, now abandoned.

(51) Int. Cl.[7] .............................................. B22D 27/08
(52) U.S. Cl. ........................ 148/538; 148/549; 164/122
(58) Field of Search ................. 148/538, 549; 164/113, 122

(56) References Cited

U.S. PATENT DOCUMENTS

| | | | | |
|---|---|---|---|---|
| 3,902,544 A | * | 9/1975 | Flemings et al. ........... | 164/122 |
| 4,397,687 A | * | 8/1983 | Bye ........................... | 164/437 |
| 4,565,241 A | * | 1/1986 | Young ........................ | 164/122 |
| 4,771,818 A | * | 9/1988 | Kenney ....................... | 164/113 |
| 5,555,926 A | | 9/1996 | Uchimura et al. .......... | 164/468 |
| 5,865,240 A | | 2/1999 | Asuke ......................... | 164/133 |
| 5,901,778 A | | 5/1999 | Ichikawa et al. ........... | 164/480 |
| 5,979,534 A | | 11/1999 | Shibata et al. .............. | 164/113 |
| 2001/0037868 A1 | * | 11/2001 | Flemings et al. ........... | 164/113 |

FOREIGN PATENT DOCUMENTS

WO    WO-98/03686    *   1/1998

* cited by examiner

*Primary Examiner*—George Wyszomierski
(74) *Attorney, Agent, or Firm*—Paul J. Cook (57) ABSTRACT

A skinless metal alloy composition free of entrapped gas and comprising primary solid discrete degenerate dendrites homogeneously dispersed within a secondary phase is formed by a process wherein the metal alloy is heated in a vessel to render it a liquid. The liquid is then rapidly cooled while vigorously agitating it under conditions to avoid entrapment of gas while forming solid nuclei homogeneously distributed in the liquid. Agitation then is ceased when the liquid contains a small fraction solid or the liquid-solid alloy is removed from the source of agitation while cooling is continued to form the primary solid discrete degenerate dendrites in liquid secondary phase. The solid-liquid mixture then can be formed such as by casting.

22 Claims, 10 Drawing Sheets

METAL ALLOY COMPOSITIONS AND PROCESS

This a divisional of prior application Ser. No. 09/666,700, filed Sep. 21, 2000, now abandoned.

The Government has rights in this invention pursuant to Contract No. DE-FC-07-98ID13618 awarded by the Department of Energy.

BACKGROUND OF THE INVENTION

This invention relates to a method and apparatus for making metal compositions containing degenerate dendrites.

Prior to the present invention, metal compositions have been made containing up to about 65 weight percent degenerate dendrites. Such compositions and their method of preparation are described in U.S. Pat. No. 3,948,650, issued Apr. 6, 1976 to Flemings et al and U.S. Pat. No. 3,954,455, issued May 4, 1976 to Flemings et al. As described by these patents, a metal alloy is heated to form a liquid-solid mixture which is vigorously agitated to convert the dendrites derived from the alloy to degenerate dendrites. The metal alloy is cooled while being vigorously agitated to the point where the viscosity of the high fraction solid material formed by cooling cannot be overcome by increasing shear forces on the high fraction solid material. These compositions can be cast directly or can be further solidified and subsequently reheated to form a thixotropic composition which can be cast directly (thixocasting). Substantial advantages are attained when casting the composition since the mold is not exposed to the heat of fusion of the material solidified prior to casting. Furthermore, the cast material experiences far less shrinkage upon solidification as compared to shrinkage as compared to an article cast from a totally liquid metal composition. However, the process for forming the high fraction solid while continuously agitating it over a significant portion of the cooling cycle causes problems. The degree of agitation required by this process causes undesirable entrapment of gas into the high fraction solid. In addition, the solid degenerate dendrites formed by the present commercial practice of the process contain a large proportion of entrapped liquid formed from eutectic metal compositions. Furthermore, during the cooling cycle, some macrosegregation of solid and liquid occurs. The entrapped gas, entrapped eutectic metal compositions and solid liquid macrosegregation causes the overall metal alloy composition thus formed to be non-uniform with resultant non-uniform physical characteristics such as strength characteristics.

The thixocasting process wherein the high fraction solid material is completely solidified by cooling and then reheated to form a liquid-solid composition is effected in part in order to form more of a microstructure wherein the solid degenerate dendrites are spherodized, resulting in more uniform alloys. However, the process is more costly since the solidified metal in the gates and runners of the forming apparatus must be reheated from the solid state to the liquid state resulting in the loss of the desired degenerate dendrite microstructure.

European Patent Application 96108499.3 (Publication No. EP0745 694A1) discloses a process for forming a liquid-solid metal alloy composition which can be formed by casting. In this process, a melt of the alloy is formed in one or more first vessels. The melt then is transferred to an insulating vessel under cooling conditions wherein crystal nuclei form in the melt. The melt then is further cooled in the insulating vessel under conditions to effect formation of spheroidal solids which form on the nuclei to produce the liquid-solid composition which is then cast. The melt is transferred into the insulating vessel either by moving it over a cooled inclined jig which diverts a melt stream into the insulating vessel or by pouring a plurality of metal alloy melts into the insulating vessel. When utilizing the latter mode of transfer, one of the melts is at a temperature lower than the liquidus temperature of a second melt so that the crystal nuclei form in the second melt. A major problem is that the poured melts entrap gas therein during the transfer and are retained therein due to the presence of solids. This results in a nonuniform final metal alloy composition having defects caused by the entrapped gas. In addition, the cooling rate and degree of agitation are poorly controlled such that the crystal nuclei are limited in number and are not homogeneously dispersed in the liquid melt. This results in degenerate dendrites containing entrapped liquid and and in a formed metal alloy product having nonuniform physical characteristics throughout its volume. Furthermore, a skin is formed on the bottom surface of the solidified product which then must be removed in order to obtain a desired homogeneous final metal alloy product.

European Patent Application No. 95 309498.4 (Publication NO. EPO 719606 A1) also discloses formation of a liquid-solid metal alloy composition by forming an alloy melt in a first vessel and transferring it to an insulating vessel over a cooled inclined surface to form crystal nuclei in the melt. The melt is then cooled to form a liquid-solid alloy composition containing spheroidal solids which can be cast. Since this process relies on a pouring step in the presence of solids, it also has the disadvantage of entrapping gas while forming spheroidal solids nonhomogeneously distributed in the final metal alloy product.

U.S. Pat. Nos. 5,144,998; 5,555,926; 5,901,778 and 5,865,240 also disclose processes for forming a liquid-solid metal alloy composition which effects formation of a metal alloy melt in a first vessel which then is transferred to a second vessel under poorly controlled cooling and agitation conditions to form solid nuclei in the melt. Since the melt is transferred from one vessel to another while partially solidifying the melt, the problems associated with gas entrapment and nonhomogeneous sized spheroidal solids are encountered as set forth above.

Accordingly, it would be desirable to provide a skinless homogeneous liquid-solid metal alloy compositions which are free from entrapped gas and wherein the solid component is free of an eutectic composition. In addition, it would be desirable to form such compositions wherein the primary solids have maximum sphericity which are homogeneously distributed throughout the volume of the metal alloy composition. Such a metal alloy composition would be more easily shaped to provide a product having homogeneous physical characteristics throughout its volume. Furthermore, it would be desirable to provide a process for forming such liquid-solid compositions wherein crystal nuclei are homogeneously dispersed within a liquid melt so that homogeneously sized primary solids can be formed throughout the volume of the liquid-solid metal alloy.

SUMMARY OF THE INVENTION

This invention is based on the discovery that a skinless homogeneous liquid-solid metal alloy composition can be formed from a molten metal alloy composition, free of entrapped gas, substantially free of entrapped eutectic in primary solids, and having primary solids which are substantially spherical by controlling conditions of cooling and vigorous agitation of a liquid precursor to the liquid-solid metal alloy. It has been found that rapid cooling and vigorous agitation can be effected for a short time over a narrow temperature range near the liquidus temperature of the molten metal alloy at a controlled cooling rate to form solid particle nuclei. Agitation is then ceased in a batch process or the liquid-solid alloy is removed from the source of agitation in a continuous process while cooling is continued so that the primary solids are formed on the solid particle nuclei while avoiding the formation of a solid dendritic network. The resultant skinless composition comprises homogeneously sized primary spheroidal solid particles substantially free of eutectic metal alloy composition and which is free of entrapped gas. The resultant liquid-solid metal alloy composition that can be formed such as by casting.

BRIEF DESCRIPTION OF THE DRAWINGS

FIG. 1(*a*) is a schematic diagram illustrating the process of this invention.

FIG. 1(*b*) is a graph of temperature as a function of time for the process of FIG. 1(*a*).

FIG. 2(*a*) is a photomicrograph of a metal composition of Example 1(a) comprising primary solids, secondary solid phase without reheating.

FIG. 2(*b*) is a graph of temperature as a function of time for the process for producing the product of FIG. 2(*a*).

FIG. 3(*a*) is a photomicrograph of a metal composition of Example 1(a) comprising primary solids, secondary solid phase with reheating.

FIG. 3(*b*) is a graph of temperature as a function of time for the process for producing the product of FIG. 3(*a*).

FIG. 4(*a*) is a photomicrograph of a metal composition of the prior art comprising primary solids, secondary solid phase and an eutectic metal alloy composition entrapped within the primary solids.

FIG. 4(*b*) is a graph of temperature as a function of time for the process for producing the product of FIG. 4(*a*).

FIG. 5(*a*) is a photomicrograph of a metal composition of the prior art comprising primary solids, secondary solid phase and an eutectic metal alloy composition entrapped within the primary solids.

FIG. 5(*b*) is a graph of temperature as a function of time for the process for producing the product of FIG. 5(*a*).

FIG. 6(*a*) is a photomicrograph of a metal composition of Example 1(b) comprising primary solids, secondary solid phase without reheating.

FIG. 6(*b*) is a graph of temperature as a function of time for the process for producing the product of FIG. 6(*a*).

FIG. 7(*a*) is a photomicrograph of a metal composition of Example 1(b) comprising primary solids, secondary solid phase with reheating.

FIG. 7(*b*) is a graph of temperature as a function of time for the process for producing the product of FIG. 7(*a*).

FIG. 8(*a*) is a photomicrograph of a metal composition of Example 2 comprising primary solids, secondary solid phase without reheating.

FIG. 8(*b*) is a graph of temperature as a function of time for the process for producing the product of FIG. 8(*a*).

FIG. 9(*a*) is a photomicrograph of a metal composition of Example 2 comprising primary solids, secondary solid phase with reheating.

FIG. 9(*b*) is a graph of temperature as a function of time for the process for producing the product of Fig. (a).

DESCRIPTION OF SPECIFIC EMBODIMENTS

The present invention provides a process for forming a skinless metal alloy comprising primary solids substantially free of eutectic metal compositions, a secondary phase which is liquid or solid, primary solids having improved sphericity homogeneously distributed throughout the volume of the metal alloy which metal alloy is free of entrapped gas. By the phrase "substantially free of entrapped eutectic metal compositions" as used herein is meant less than about 2% by volume, preferably less than 1% by volume eutectic metal compositions entrapped in the primary solids based of the volume of primary solids. The primary solids of the metal alloy compositions of this invention are characterized by an overall improved sphericity as compared to metal alloy composition of the prior art. This results in providing metal alloys which are more easily formed since the sphericity of the primary solids reduces friction within the metal alloy when it is moved during a shaping step as compared to metal alloys having primary solids with irregular shapes or having dendritic elongations at their surfaces.

The process of this invention comprises a first step of forming a metal alloy liquid composition within a vessel. The liquid metal alloy composition positioned within the vessel then can be cooled while vigorously agitating the cooled alloy such as by stirring under conditions to form solid nuclei particles while avoiding entrapment of gas within the agitated alloy compositions. Alternatively, the liquid metal alloy composition can be transferred to a second vessel under conditions to prevent formation of solids prior to cooling. Thus, the temperature of the walls of the second vessel can be above, at or below the liquidus temperature of the metal alloy composition. When the wall temperature is below the liquidus temperature, the wall temperature is raised to convert any formed solids to a liquid. In addition, the liquid metal alloy composition is rendered quiescent so that entrapped gas, if any, floats to the liquid surface without interference by the presence of solids and is removed from the liquid. The alloy is vigorously agitated while being cooled in a manner such that the solid nuclei are distributed throughout the metal liquid alloy composition substantially homogeneously. The degree of agitation is such as to effect substantially homogeneous distribution of the formed crystal nuclei while avoiding entrapment of gas. Agitation is effected while utilizing a rapid cooling rate range for a short time such as between about 1 second and about 1 minute, preferably between about 1 and about 30 seconds over a temperature range corresponding to a percent solidification of the alloy of between about 1 and about 20% weight fraction solids, preferably between about 3 and about 7% weight fraction solids while the liquid composition is cooled without agitation to effect forming the solid nuclei. Agitation can be effected utilizing a cool probe in any manner which avoids excessive cavitation at the liquid surface thereby to avoid entrapment of gas in the liquid. The probe can be rendered cool by passing a heat exchange fluid, such as water therethrough. Representative suitable agitation means include one or a plurality of cylindrical rods provided with an internal cooling means, a helical probe, or the like that preferably extends the depth of the liquid. The probe extends into a portion of the depth of the liquid up to substantially 100% of the depth of the liquid to promote homogeneous dispersion of the crystal nuclei. Agitation then is ceased in a batch process or the liquid-solid alloy is removed from the source of agitation in a continuous process. The resultant liquid-solid metal alloy composition then is cooled within the vessel to effect formation of spheroidal solid particles about the solid nuclei particles up to a concentration wherein the spheroidal solid particles increase the viscosity of the overall liquid-solid composition where it can be moved into a formation step such as a casting step. Generally, the upper weight percent primary solids, is between about 40 and about 65 percent and preferably contains 10 to 50 percent based on the total weight of the liquid solid composition. Surprisingly, the formation of spheroidal solid particles without agitation is effected by coarsening without the formation an interconnected dendrite network. In addition, since agitation is effected only for a short period of time, the inclusion of entrapped gas within the alloy composition is avoided. In addition, it has been found that by operating in this manner, macrosegregation of elements is minimized or eliminated throughout the volume of the metal alloy product produced. The resultant liquid-solid composition then is formed such as by casting.

The metal alloy composition comprising the primary solids and the secondary phase of the composition of this invention can be formed from a wide variety of metals or alloys which, when frozen from a liquid state without agitation form a dendritic network structure. When the composition of this invention includes primary solid discrete particles, the composition contains a secondary phase which can be either solid or liquid. The secondary phase is solid when the metal composition is solid and liquid when the metal composition is partially liquid. The secondary solid can be formed of one or more solid compositions. The primary particles comprise small degenerate dendrites or nodules which are generally spheroidal in shape and are formed as a result of first agitating the melt while cooling when the secondary phase is liquid followed by cooling the secondary phase of the partially molten alloy under a quiescent condition without agitation. The primary solid particles are made up of a single phase having an average composition different from the average composition of the surrounding secondary phase, which secondary phase can itself comprise primary and secondary phases upon further solidification.

By the term "primary solid" as used herein is meant the phase or phases solidified to form discrete degenerate dendrite particles as the temperature of the melt is reduced below the liquidus temperature of the metal into the liquid-solid temperature range after the solid nuclei are formed and prior to casting the liquid-solid slurry form. The primary solids are degenerate dendrites in that they are characterized by having smoother surfaces and less branched structures which approach a more spherical configuration than normal dendrites and do not have a dendrite structure when interconnection of the primary particles is effected to form a network dendritic structure. In addition, the primary solids are substantially free on eutectics. By the term "secondary solid" as used herein is meant the phase or phases that solidify from the liquid existing in the slurry at a lower temperature than at which the primary solid particles are formed after formation of primary solids ceases. Normally solidified alloys have branched dendrites separated from each other in the early stages of solidification, i.e., up to 15 to 20 wt. percent solid, and develop into an interconnected network as the temperature is reduced and the weight fraction solid increase. The composition containing primary solids of this invention, on the other hand, prevents formation of the interconnected network by maintaining the discrete primary particles separated from each other by the liquid phase even up to solid fractions of about 65 weight percent.

The secondary solid which is formed during solidification from the liquid phase subsequent to forming the primary solid contains one or more phases of the type which would be obtained during solidification by presently employed casting processes. That is, the secondary phase comprises solid solutions, or mixtures of dendrites, compounds and/or solid solutions.

The size of the primary particles depends upon the alloy or metal composition employed, the temperature of the solid-liquid mixture and the time the alloy spends in the solid-liquid temperature range. Thus, in general, the size of the primary particles depends on composition, thermo-mechanical history of the slurry, number of crystal nuclei formed, cooling rate and can range from about 1 to about 1,000 microns and are homogeneously sized throughout the metal alloy composition. It is preferred that the composition contain between 10 and 50 weight percent primary solids since these compositions have a viscosity which promotes ease of casting or forming.

The compositions of this invention can be formed from any metal alloy system or pure metal regardless of its chemical composition which, when frozen from the liquid state without forming solid nuclei forms a dendritic structure. Even though pure metals and eutectics melt at a single temperature, they can be employed to form the composition of this invention since they can exist in liquid-solid equilibrium at the melting point by controlling the net heat input or output to the melt so that, at the melting point, the pure metal or eutectic contains sufficient heat to fuse only a portion of the metal or eutectic liquid. This occurs since complete removal of heat of fusion in a slurry employed in the casting process of this invention cannot be obtained by equating the thermal energy supplied and that removed by a cooler surrounding environment. Representative suitable alloys include lead alloys, magnesium alloys, zinc alloys, aluminum alloys, copper alloys, iron alloys, nickel alloys, cobalt alloys. Examples of these alloys are lead-tin alloys, zinc-aluminum alloys, zinc-copper alloys, magnesium-aluminum alloys, magnesium-aluminum-zinc alloys, magnesium-zinc alloys, aluminum-silicon alloys, aluminum-copper-zinc-magnesium alloys, copper-tin bronzes, brass, aluminum bronzes, steels, cast irons, tool steels, stainless tells, super-alloys, and cobalt-chromium alloys, or pure metals such as iron, copper or aluminum.

The following examples illustrate the present invention and are not intended to limit the same.

EXAMPLE Ia

A356 Alloy Processed in a High-Density Graphite Crucible

The following is a detailed description of a method for producing A356 aluminum alloys with non-dendritic structures, with reference to FIGS. 1–5.

Figure 1A:
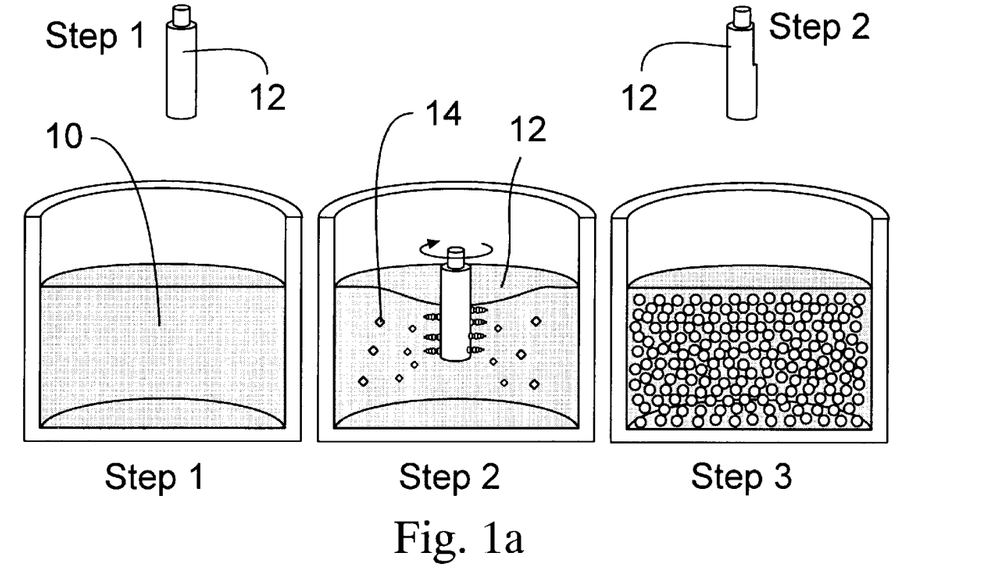
Figure 1B:
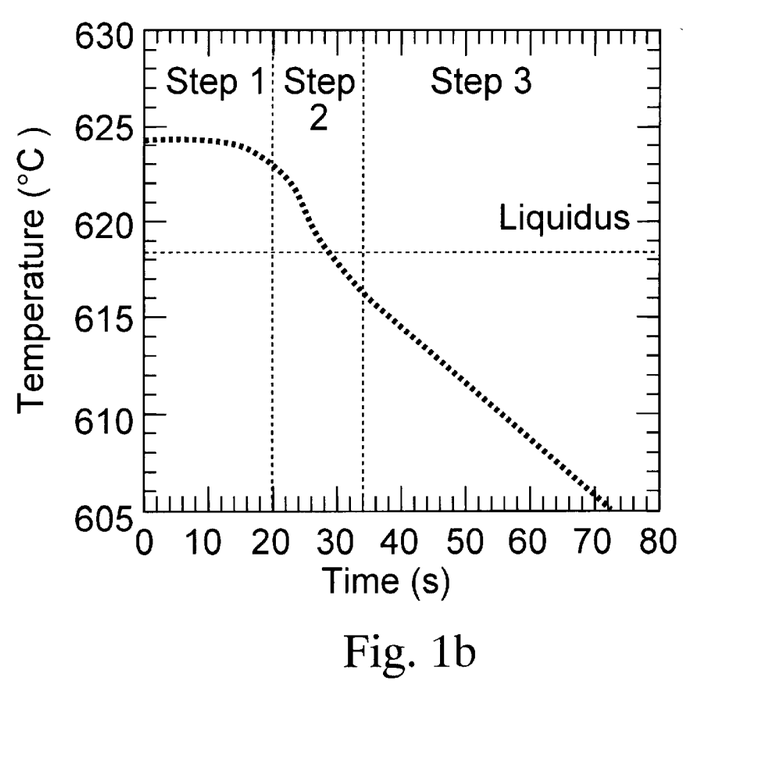
Figure 2:
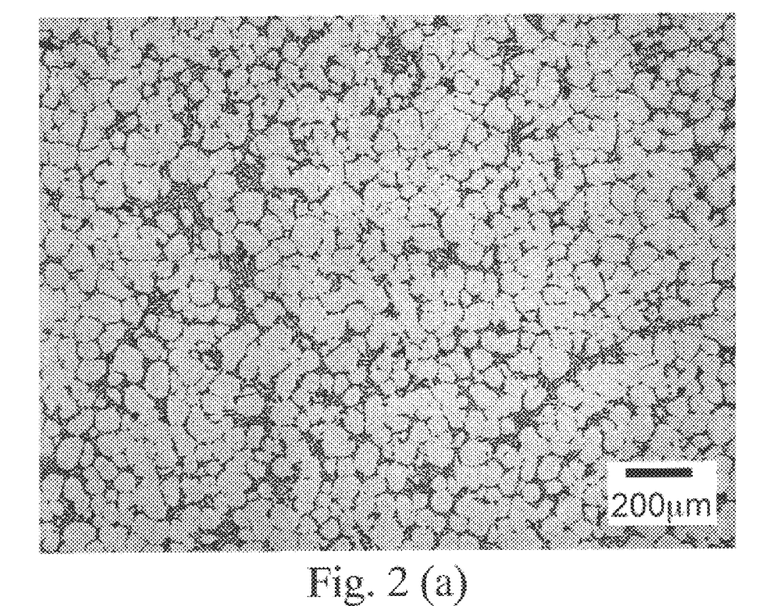
Figure 3:
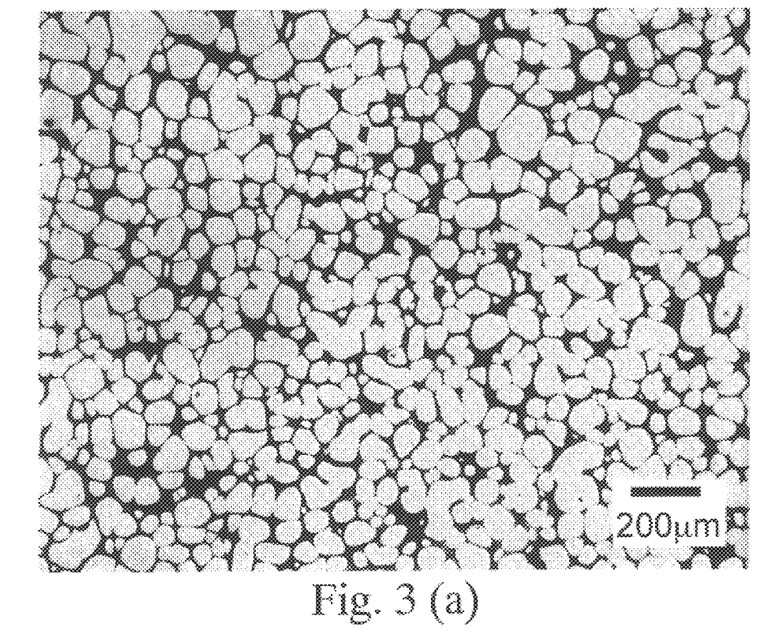
Figure 4:
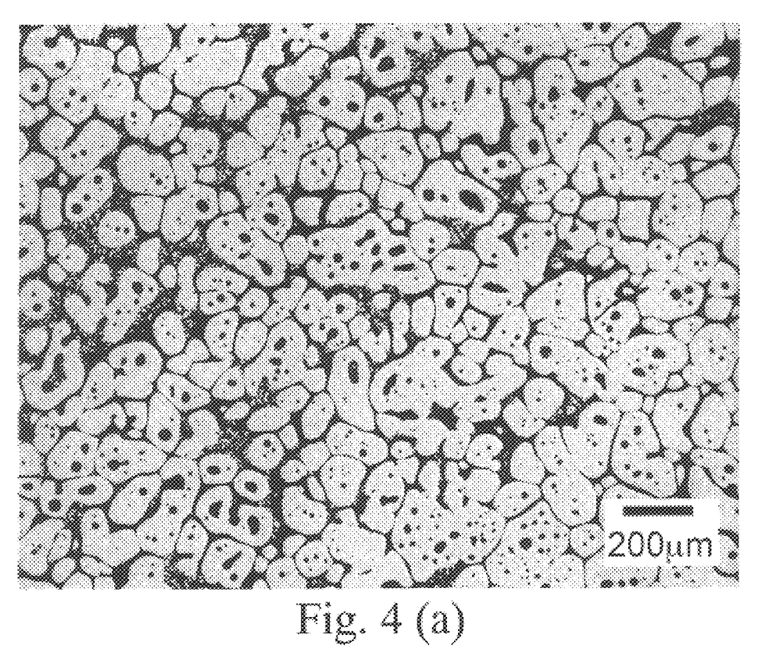
Figure 5:
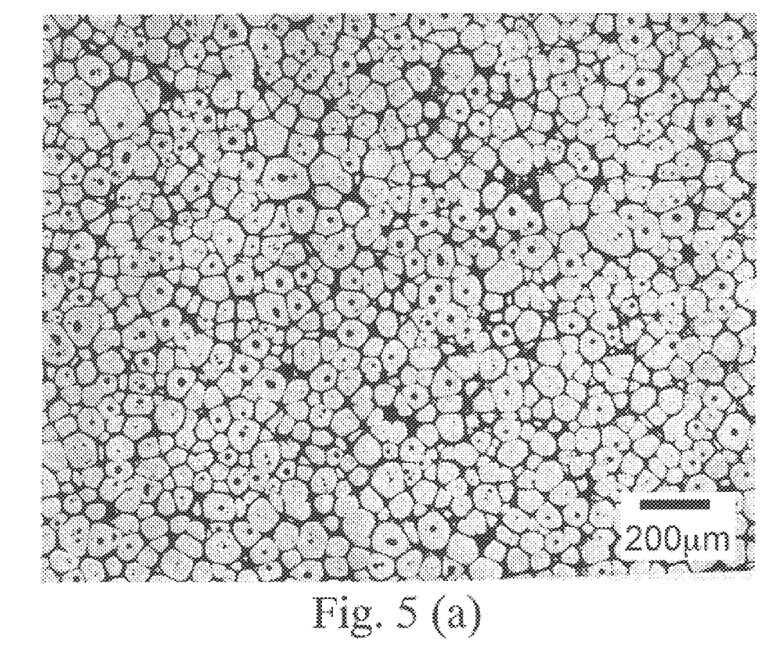

About 405 g of A356 aluminum alloy stock were melted in a high-density graphite crucible 3 inches tall, with a 2.5 inch inner diameter, and a 0.25 inch wall thickness. The crucible was placed inside an air-circulating resistance furnace, which was programmed to slowly cool the melt to a temperature 7° C. above its liquidus temperature. After holding at that temperature for several minutes, a solid copper rod with a 0.5 inch diameter, rotating at 1236 rpm, and initially at room temperature, was introduced in the furnace through an opening in its top and immersed into the melt 1.8 inches. The immersed, rotating rod provided a combination of rapid cooling and vigorous agitation of the melt. This led to a rapid decrease of the melt temperature, which dropped below the liquidus temperature, causing copious nucleation of primary aluminum particles. The rotating rod remained in the melt for 15 seconds, dropping the melt temperature to 615° C., about 2° C. below the liquidus temperature, which corresponds to about 3% fraction solid. After the combined cooling and agitation period, the rod was removed from the melt, and the melt was cooled and solidified completely. FIG. 1(a) shows the three general processing steps of this invention. In step 1, the completely liquid melt 10 is formed prior to introducing rotating cold rod 12 into the melt 10. In step 2, crystal nuclei 14 are formed in the liquid melt 10 as a result of contact with the rotating cold rod 12. In step 3, the rod 12 is removed from the liquid-solid metal composition 16 in which spheroidal primary solids are formed while cooling is continued at a cooling rate shown in FIG. 1(b) until the composition is solid.

FIG. 2(a) shows the homogeneous structure found throughout the volume of the solidified alloy after processing according to the above example and the cooling curve shown in FIG. 2(b). FIG. 3(a) shows the same material after rapidly reheating to 590° C., isothermally holding for approximately 10 minutes, and quenching according to the temperature profile of FIG. 3(b). FIGS. 4(a) and (b) shows the microstructure and temperature profile of reheated 3 inch diameter MHD billet (electromagnetically stirred) used commercially for thixocasting. FIGS. 4(a) and (b) shows the microstructure and temperature profile for reheated 1 inch diameter of a commercially available a Stress Induced Melt Activation (SIMA) processed billet.

The striking differences when comparing the microstructures of the reheated material processed by the method described by this invention with those of the reheated MHD and SIMA billets, are the negligible amount of entrapped eutectic compositions, and the improved sphericity found in the reheated material processed by the method described by this invention. This difference is of critical importance during semisolid metal forming operations for which the material is to be used. At forming temperatures, the entrapped eutectic compositions are liquid, but do not contribute to the flow behavior of the semi-solid material, which behaves as if it contained a larger amount of primary solid particles. When significant amounts of entrapped liquid are present in unpredictable quantities, as shown in the reheated MHD material, flow behavior becomes difficult to predict and forming operations may yield large amounts of defective products.

EXAMPLE 1b

A356 Alloy Processed in a Clay-Graphite Crucible

The following is a detailed description of a method for producing A356 aluminum alloys with non-dendritic structures, with reference to FIGS. 6(a), 6(b), 7(a) and 7(b).

Figure 6:
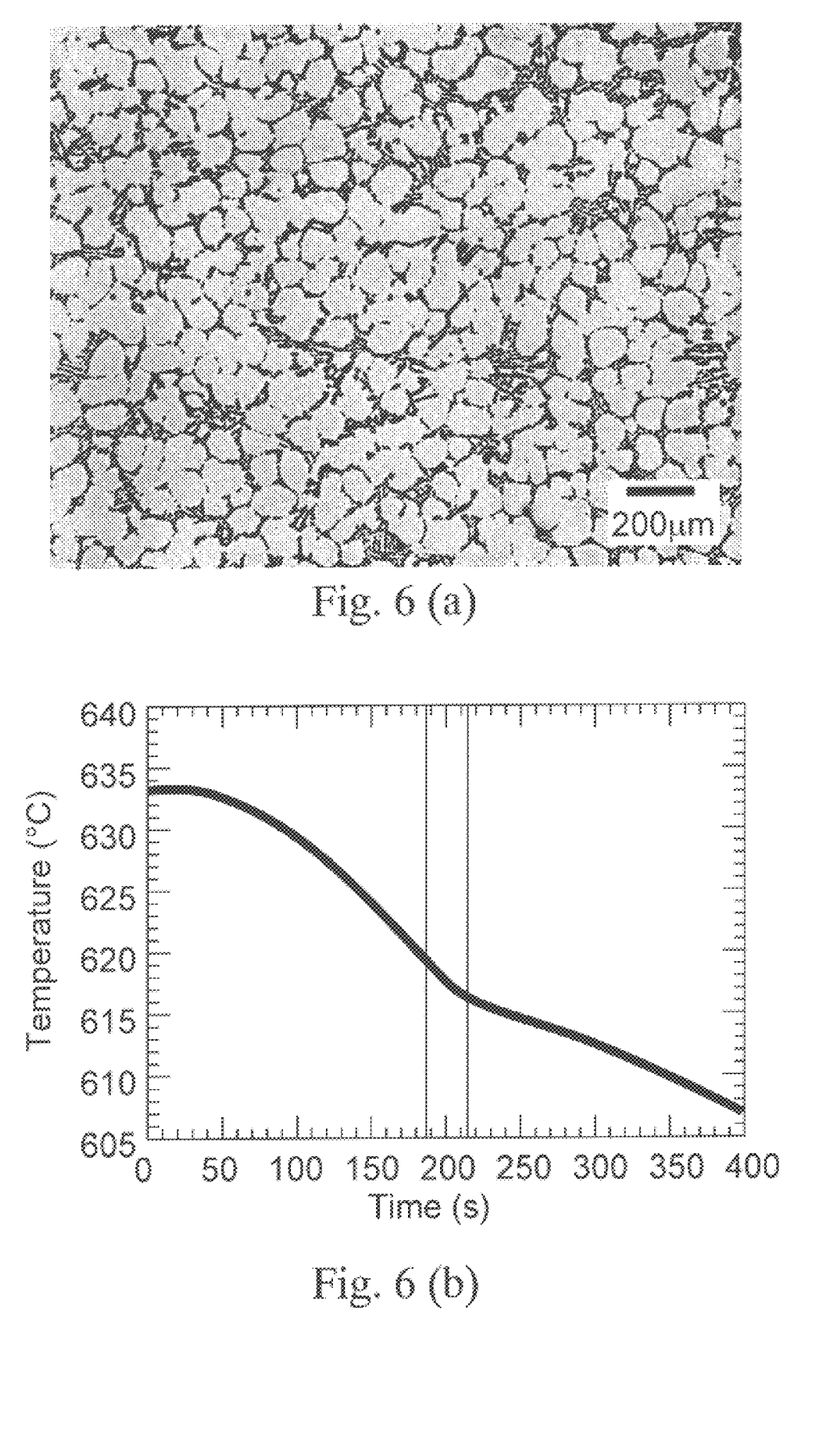
Figure 7:
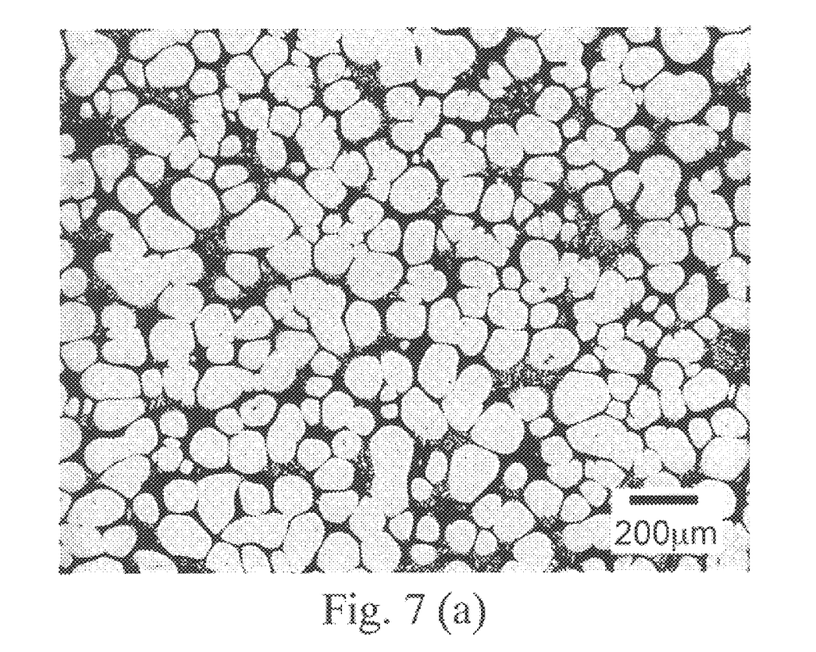

About 540 g of A356 aluminum alloy stock were melted in a clay-graphite crucible 5 inches tall, with a 3 inch inner diameter, and a 0.6 inch wall thickness. The crucible was placed inside an air-circulating resistance furnace, which was programmed to slowly cool the melt to a temperature slightly above its liquidus temperature. When the melt had been cooled to 3° C. above the liquidus temperature, a helix made with copper rod, rotating at 780 rpm, and initially at room temperature, was introduced in the furnace through an opening in its top and immersed into the melt 2 inches. The helix had a diameter of 1 inch and was made from rod with a 0.25 inch diameter. The immersed, rotating helix provided a combination of rapid cooling and vigorous agitation of the melt. This led to a rapid decrease of the melt temperature, which dropped below the liquidus temperature, causing copious nucleation of primary aluminum particles. The rotating helix remained in the melt for 30 seconds, dropping the melt temperature to 616° C., about 1° C. below the liquidus temperature, which corresponds to about 1% fraction solid. After the combined cooling and agitation period, the rod was removed from the melt, and the melt was cooled and solidified completely. FIG. 6(a) shows the homogeneous structure found throughout the volume of the solidified alloy after processing according to the above example and the cooling curve shown in FIG. 6(b). FIG. 7(a) shows the same material after rapidly reheated to 590° C., isothermally holding for approximately 10 minutes, and quenching according to the temperature profile in FIG. 7(b).

EXAMPLE 2

A356 Alloy Processed Using an Induction Furnace

The following is a detailed description of a method for producing A356 aluminum alloys with non-dendritic structures, with reference to FIGS. 8(a), 8(b), 9(a) and 9(b).

Figure 8:
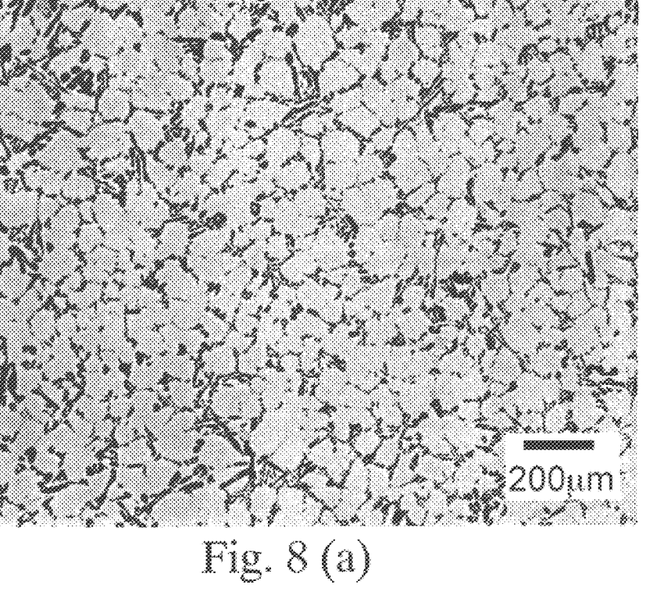
Figure 9:
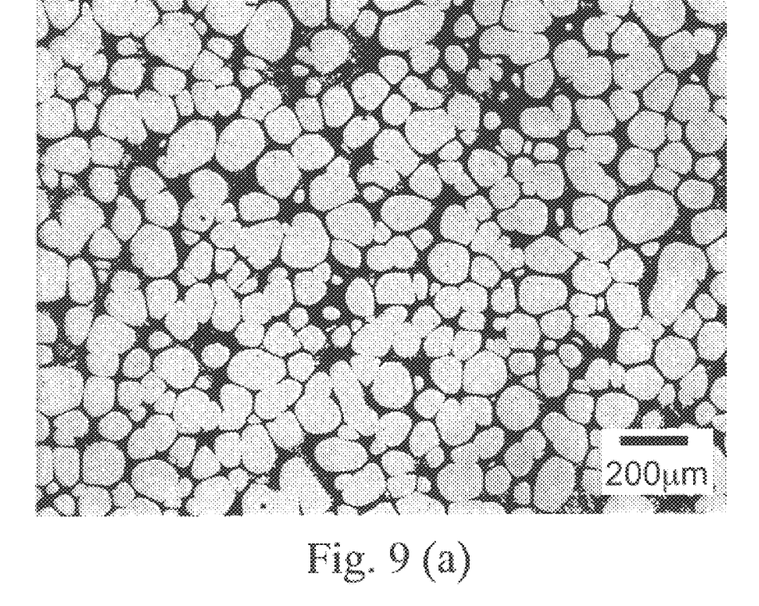

About 590 g of A356 aluminum alloy stock were melted in a high-density graphite crucible 4 inches tall, with a 3 inch inner diameter, and a 0.5 inch wall thickness. The crucible was placed inside an induction furnace, which was programmed to superheat the melt roughly 50° C. above its liquidus temperature. The furnace power was then shut off and the melt was allowed to slowly cool in the crucible. When the melt had been cooled to within 6° C. above the liquidus temperature, a helix made with copper rod, rotating at 1000 rpm, and initially at room temperature, was introduced in the furnace through an opening in its top and immersed into the melt 2 inches. The helix has a diameter of 1 inch and was made from rod with a 0.25 inch diameter. The immersed, rotating helix provided a combination of rapid cooling and vigorous agitation of the melt. This led to a rapid decrease of the melt temperature, which dropped below the liquidus temperature, causing copious nucleation of primary aluminum particles. The rotating helix remained in the melt for 32 seconds, dropping the melt temperature to 608° C., about 9° C. below the liquidus temperature, which corresponds to about 18% fraction solid. After the combined cooling and agitation period, the rod was removed from the melt, and the melt was cooled and solidified completely. FIG. 8(a) shows the homogeneous structure found throughout the volume of the solidified alloy after processing according to the above example and the cooling curve shown in FIG. 8(b). FIG. 9(a) shows the same material after rapidly reheated to 590° C., isothermally holding for approximately 20 minutes, and quenching according to the temperature profile in FIG. 9(b).

Figure 10:
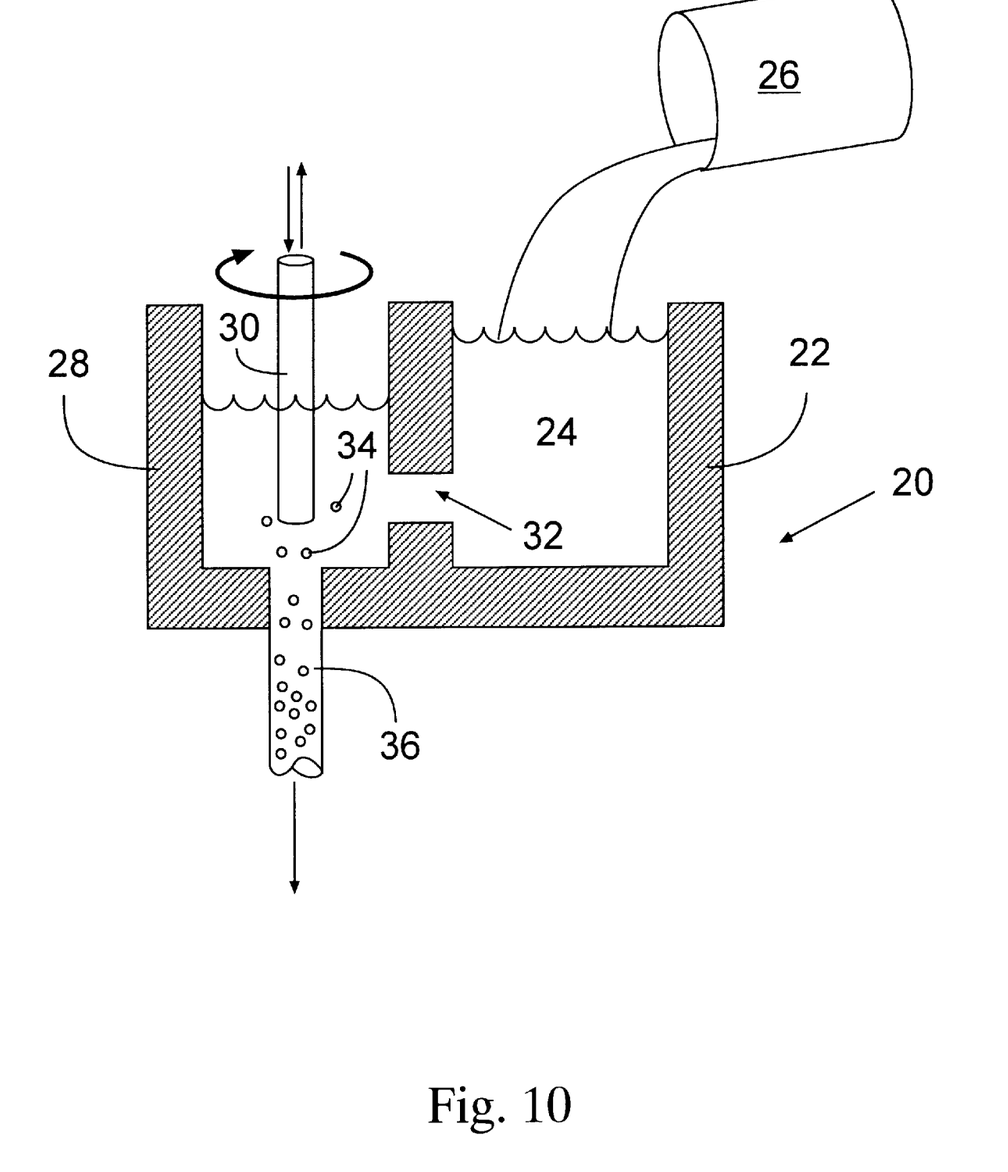
FIG. 10 is a schematic diagram illustrating the continuous process of this invention.

As shown in FIG. 10 a continuous process for forming the metal alloy compositions of this invention is illustrated. A vessel 20 comprises a first subvessel 22 for holding a completely liquid metal composition 24 which is introduced from vessel 26. Subvessel 28 is adapted to receive water cooled rotating rod 30 and to receive the liquid metal composition through passageway 32 which can be opened or closed with conventional valve means (not shown). Crystal nuclei 34 are formed in subvessel 28 in the manner described above. The liquid-solid composition 36 is removed from the agitating rod 30 in subvessel 28 either by gravity, under pressure or by a suitable pulling force on the composition 36 so that it can be cooled in the absence of agitation to form a composition that can be shaped either directly or by being solidified and then reheated to form a liquid-solid composition.

We claim:

1. The method for forming a solid skinless metal composition free of entrapped gas and being derived from a liquid-solid composition comprising solid discrete degenerate dendrites homogeneously distribute a liquid phase of said metal composition, said solid discrete degenerate dendrites being substantially free of eutectics which comprises:

(a) heating a metal alloy composition in a vessel to form a liquid free of solids and comprising said metal composition, (b) cooling said liquid while agitating said liquid with at least one cool rotating probe extending into said liquid under conditions to form solid nuclei homogeneously dispersed within said liquid while avoiding entrapment of gas in said liquid to form a liquid-solid composition containing between about 1 and about 20 weight fraction solid, (c) ceasing agitation of said liquid-solid composition containing between about 1 and about 20 weight fraction solid or removing the liquid-solid composition containing between about 1 and about 20 weight fraction solid from the source of agitation and (d) continuing cooling said liquid-solid composition from step (c) while said liquid-solid composition from step (c) is quiescent until said liquid-solid composition from step (c) becomes solid.

2. The method of claim 1 wherein said liquid is cooled in said vessel.

3. The method of claim 1 wherein said liquid is transferred to a second vessel prior to step (b).

4. The method of claim 3 wherein walls of said second vessel are initially at a temperature above the liquidus temperature of said metal alloy composition.

5. The method of claim 3 wherein walls of said second vessel are initially at a temperature at the liquidus temperature of said metal alloy composition.

6. The method of claim 3 wherein walls of said second vessel are initially at a temperature below the liquidus temperature of said metal by composition.

7. The method of claim 1 wherein said steps (b), and (d) are conducted continuously.

8. The method for forming a shaped skinless metal composition free of entrapped gas and having solid discrete degenerate dendrites homogeneously distributed within a liquid phase of said metal composition, said solid discrete degenerate dendrites being substantially free of eutectics which comprises:

(a) heating a metal alloy composition in a vessel to form a liquid free of solids and comprising said metal composition, (b) cooling said liquid while agitating said liquid with at least one cool rotating probe extending into said liquid under conditions to form solid nuclei homogeneously dispersed within said liquid while avoiding entrapment of gas in said liquid to form a liquid-solid composition containing between about 1 and about 20 weight fraction solid, c) ceasing agitation of said liquid-solid composition containing between about 1 and about 20 weight fraction solid or removing the liquid-solid composition containing between about 1 and about 20 weight fraction solid from the source of agitation, (d) continuing cooling said liquid-solid composition from step (c) while said liquid-solid composition from step (c) is quiescent until said liquid-solid composition from step (c) contains up to about 65 weight percent primary solids homogeneously dispersed in a liquid secondary phase, and (e) shaping aid liquid-solid composition formed in step (d).

9. The method of claim 8 wherein said liquid is cooled in said vessel.

10. The method of claim 8 wherein said steps (b), (c), (d) and (e) are conducted continuously.

11. The method of any one of claims 1, 8, 2, 9, 3, 4, 5, or 6 wherein agitation is effected with one probe extending into the liquid.

12. The method of claim 11 wherein said liquid is cooled in step (b) to form a liquid-solid composition containing between about 3 and about 7% weight fraction solids.

13. The method of claim 11 wherein said probe is a cylindrical rod.

14. The method of claim 11 wherein said probe is a helical probe.

15. The method of any one of claims 1, 8, 2, 9, 3, 4, 5, or 6 wherein agitation is effected with a plurality of probes extending into the liquid.

16. The method of claim 15 wherein said liquid is cooled in step (b) to form a liquid-solid composition containing between about 3 and about 7% weight fraction solids.

17. The method of claim 15 wherein said plurality of probes are cylindrical rods.

18. The method of claim 15 wherein said plurality of probes are helical probes.

19. The method of any one of claims 1, 8, 2, 9, 3, 4, 5, 6, 7, or 10 wherein said liquid is cooled in step (b) to form a liquid-solid composition containing between about 3 and about 7% weight fraction solids.

20. The method of any one of claims 1, 8, 2, 9, 3, 4, 5, 6, 7, or 10 wherein said at least one probe is a cylindrical rod.

21. The method of any one of claims 1, 8, 2, 9, 3, 4, 5, 6, 7, or 10 wherein said at least one probe is a helical probe.

22. The method of any one of claims 8 or 10 wherein said cooling in step (d) is effected to form a liquid-solid metal composition containing between about 17 and about 50 weight percent primary solids.

* * * * *